(12) United States Patent
Gupta et al.

(10) Patent No.: US 12,066,979 B2
(45) Date of Patent: Aug. 20, 2024

(54) INTELLIGENT AND AUTOMATED REVIEW OF INDUSTRIAL ASSET INTEGRITY DATA

(71) Applicant: General Electric Company, Schenectady, NY (US)

(72) Inventors: Alok Gupta, San Ramon, CA (US); John Spirtos, Boston, MA (US); Robert Schwaber, Boston, MA (US); Andrew Chappell, San Ramon, CA (US); Ashish Jain, Menlo Park, CA (US); Alex Tepper, Norwalk, CT (US)

(73) Assignee: General Electric Company, Schenectady, NY (US)

( * ) Notice: Subject to any disclaimer, the term of this patent is extended or adjusted under 35 U.S.C. 154(b) by 955 days.

(21) Appl. No.: 17/092,558

(22) Filed: Nov. 9, 2020

(65) Prior Publication Data

US 2021/0133149 A1    May 6, 2021

Related U.S. Application Data

(63) Continuation of application No. 15/591,871, filed on May 10, 2017, now Pat. No. 10,866,927.

(51) Int. Cl.
| | |
|---|---|
| *G06Q 10/00* | (2023.01) |
| *G01M 11/08* | (2006.01) |
| *G06F 16/16* | (2019.01) |
| *G06Q 10/20* | (2023.01) |

(52) U.S. Cl.
CPC ......... *G06F 16/164* (2019.01); *G01M 11/081* (2013.01); *G06Q 10/20* (2013.01)

(58) Field of Classification Search
CPC ..... G06F 16/164; G01M 11/081; G06Q 10/20
See application file for complete search history.

(56) References Cited

U.S. PATENT DOCUMENTS

| | | | | |
|---|---|---|---|---|
| 2009/0265193 A1* | 10/2009 | Collins | ............. | G06Q 30/0185 |
| | | | | 901/46 |
| 2014/0207862 A1* | 7/2014 | Domke | ................. | G06Q 10/06 |
| | | | | 709/204 |
| 2015/0193735 A1* | 7/2015 | Lavrov | ................. | G06Q 10/10 |
| | | | | 705/342 |

* cited by examiner

*Primary Examiner* — Mohamed Charioui
*Assistant Examiner* — Christine Y Liao
(74) *Attorney, Agent, or Firm* — Mintz, Levin, Cohn, Ferris, Glovsky and Popeo, P.C.

(57) ABSTRACT

In some embodiments, a meta-data inspection data store may contain hierarchical components and subcomponents of an industrial asset and define points of interest. An industrial asset inspection platform may access that information and generate an inspection plan, including an association of at least one sensor type with each of the points of interest. The platform may then store information about the inspection plan in an inspection plan data store and receive inspection data (e.g., from a manual inspection, from an inspection robot, from a fixed sensor, etc.). A smart tagging algorithm may be executed to associate at least one point of interest with an appropriate portion of the received inspection data based on information in the inspection plan data store.

18 Claims, 15 Drawing Sheets

| ASSET INSPECTION IDENTIFIER 1402 | ASSET IDENTIFIER 1404 | ASSET HIERARCHY DATA 1406 | INSPECTION PLAN DATA 1408 | POINTS OF INTEREST 1410 | COLLECTED SENSOR DATA 1412 | SMART TAGS 1414 |
|---|---|---|---|---|---|---|
| AI_101 (JULY 1, 2020) | A_101 | | | | | |
| AI_102 (JULY 2, 2020) | A_101 | | | | | |
| AI_103 (JULY 3, 2020) | A_101 | | | | | |
| AI_201 (JULY 1, 2020) | A_102 | | | | | |
| AI_202 (JULY 2, 2020) | A_102 | | | | | |

INTELLIGENT AND AUTOMATED REVIEW OF INDUSTRIAL ASSET INTEGRITY DATA

CROSS-REFERENCE TO RELATED APPLICATION

This application is a continuation of, and claims priority to, U.S. patent application Ser. No. 15/591,871 filed May 10, 2017, and entitled INTELLIGENT AND AUTOMATED REVIEW OF INDUSTRIAL ASSET INTEGRITY DATA, which is herein incorporated by reference in its entirety.

BACKGROUND

The subject matter disclosed herein relates to industrial asset management, and more particularly, to monitoring and managing the health of an industrial asset.

Various entities may own or maintain various types of industrial assets as part of their operation. Such assets may include physical or mechanical devices or structures, which may, in some instances, utilize electrical and/or chemical technologies. Such assets may be used or maintained for a variety of purposes and may be characterized as capital infrastructure, inventory, or by other nomenclature depending on the context. For example, industrial assets may include distributed assets, such as a pipeline or an electrical grid, as well as individual or discrete assets, such as a wind turbine, airplane, a flare stack, vehicle, etc. Assets may be subject to various types of defects (e.g., spontaneous mechanical defects, electrical defects, or routine wear-and-tear) that may impact operation. For example, over time, an industrial asset may undergo corrosion or cracking due to weather or may exhibit deteriorating performance or efficiency due to the wear or failure of one or more component parts.

In some cases, a human inspector may inspect and analyze an industrial asset. For example, an inspector may look for and locate corrosion on the surface of an asset. However, depending on the location, size, and/or complexity of the asset and the surrounding environment, having one or more humans manually perform the inspection may take a substantial amount of time. Additionally, some inspection tasks may be boring, dirty, or otherwise unsuitable for a human. For example, some assets may have locations that are not easily accessible by humans due to height, confined spaces, danger, or the like.

To address these issues, an asset inspection plan may be generated and executed. For example, an inspector might examine certain pre-determined locations or sub-components of an asset looking for defects. Note that traditional industrial asset inspection requires a collection of various data related to asset integrity and uses specific software to analyzing specific types of data streams. For example, a typical industrial asset may have several different types of inspection data that need to be analyzed (e.g., photographs, temperatures, ultrasonic data, etc.). Existing methods require manual data correlation and the fusion of different analyses to create the final inspection summary. Besides being cumbersome, such approaches may be error prone and/or inefficient. For example, errors and inefficiencies might be introduced by the manual effort required to correlate disparate data sources and/or to tag the to the appropriate asset locations and sub-components.

It would therefore be desirable to provide systems and methods to facilitate an intelligent and automated review of industrial asset integrity data in an accurate and efficient fashion.

SUMMARY

According to some embodiments, a meta-data inspection data store may contain hierarchical components and sub-components of an industrial asset and define points of interest. An industrial asset inspection platform may access that information and generate an inspection plan, including an association of at least one sensor type with each of the points of interest. The platform may then store information about the inspection plan in an inspection plan data store and receive inspection data (e.g., manually collected data, streams of sensor information from at least one inspection device, etc.). A smart tagging algorithm may be executed to associate at least one point of interest with an appropriate portion of inspection data based on information in the inspection plan data store. According to some embodiments, the platform may then generate an inspection report based on the appropriate portions of the received inspection data and store the inspection report in an inspection information data store.

Some embodiments comprise: means for accessing, by an industrial asset inspection platform, information in a meta-data inspection data store to generate an inspection plan, including an association of at least one sensor type with each of a plurality of points of interest, wherein the meta-data inspection data store contains electronic records associated with the industrial asset, the electronic records representing hierarchical components and subcomponents of the industrial asset and defining the plurality of points of interest; means for storing information about the inspection plan in an inspection plan data store; means for receiving, via a communication port, inspection data (e.g., manually collected data, at least one stream of sensor information from at least one inspection device, etc.); and means for executing a smart tagging algorithm to associate at least one of the plurality of points of interest with an appropriate portion of the received inspection data based on information in the inspection plan data store.

Technical advantages of some embodiments disclosed herein include improved systems and methods to facilitate an intelligent and automated review of industrial asset integrity data in an accurate and efficient fashion.

BRIEF DESCRIPTION OF THE DRAWINGS

FIG. 14 is a tabular portion of an inspection information database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Some embodiments described herein relate to providing an intelligent and automated review of industrial asset integrity data. Such embodiments may be useful when inspecting industrial assets associated with various entities, including business or corporate entities, governments, individuals, non-profit organizations, and so forth. As discussed herein, such assets may be generally discrete or limited in their extent (e.g., a vehicle such as a plane, helicopter, ship, submersible, space launch vehicle, satellite, locomotive, and so forth) or may be geographically distributed (e.g., a road or rail track, a port or airport, a pipeline or electrical infrastructure, a power generation facility or manufacturing plant, and so forth). Some embodiments described herein may be used to inspect assets of these types (as well as others not listed) in a manual, autonomous, or semi-autonomous manner using robotic intermediaries.

With this in mind, it will be appreciated that in a variety of fields, assets, such as distributed assets and/or individual assets, may be used to perform any number of operations. Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, understanding the health of the asset depends on inspecting for such defects in a timely and effective manner.

In some conventional approaches, one or more human agents may inspect the asset for wear at limited intervals to determine the health of the asset. For example, an inspector might manually correlate and fuse data from a number of different types of sensors. However, having a human review and/or monitor these aspects of an inspection process can be a difficult and error-prone task. This can be especially true when a planned inspection will take a substantial amount of time, the inspection can potentially take various routes, there are many points of interest to be examined, the asset and/or surrounding environment are complex and dynamically changing, other people and/or robots are simultaneously operating in the area, etc.

Figure 1:
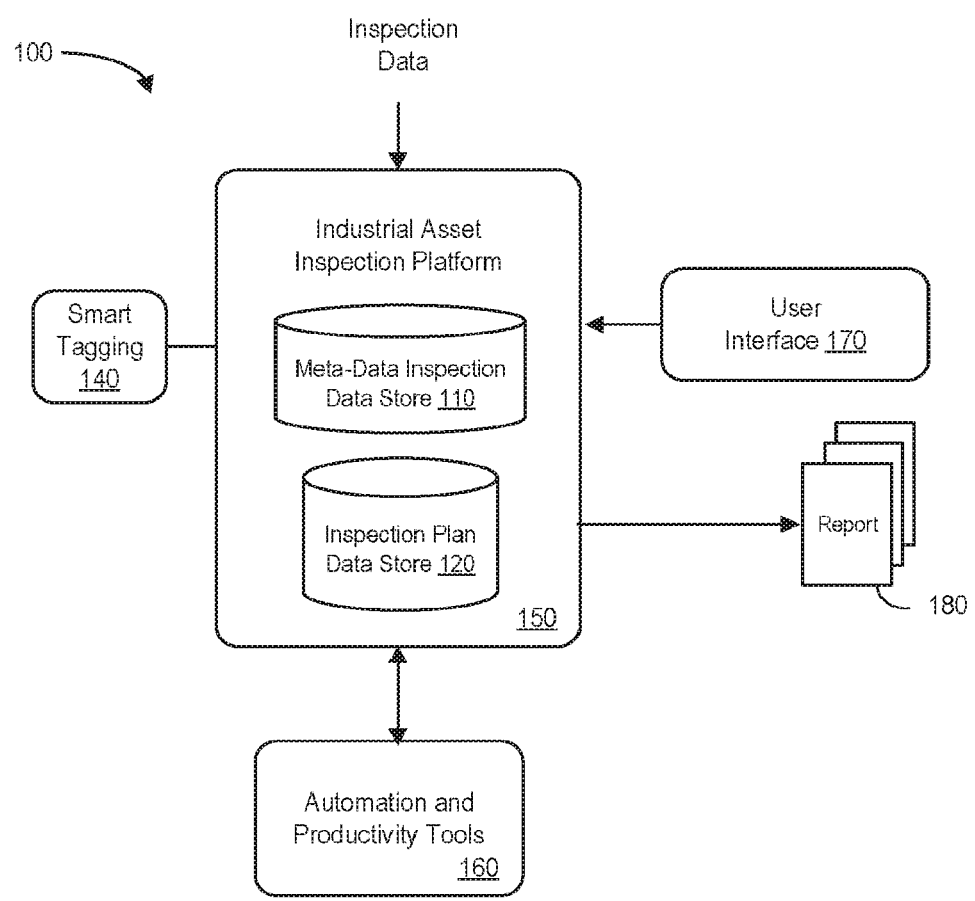
FIG. 1 is a high-level block diagram of an industrial asset inspection system in accordance with some embodiments.

It would therefore be desirable to provide systems and methods to facilitate an intelligent and automated review of industrial asset integrity data in an accurate and efficient fashion. FIG. 1 is a high-level block diagram of a system 100 according to some embodiments of the present invention. In particular, the system 100 includes an industrial asset inspection platform 150 that may access information in a meta-data inspection data store 110 (e.g., storing a set of electronic records representing hierarchical components and sub-components of an industrial asset and defining points of interest) and an inspection plan data store 120 (e.g., storing a set of electronic records defining an inspection plan including, for example, sensor data, points of interest, a path of movement for an inspection robot, etc.). The industrial asset inspection platform 150 may also exchange information with remote user interface devices 170 (e.g., via a firewall). According to some embodiments, the industrial asset inspection platform 150 may communicate with the user interface devices 170, access information in the meta-data inspection data store 110 and/or the inspection plan data store 120, receive inspection data (e.g., streams of sensor information), execute smart tagging 140, utilize automation and productivity tools 160, and generate inspection reports 180. According to some embodiments, the received inspection data streams may be exchanged via a communication port, such as a port adapted to exchange information (including wired and wireless exchanges of information) in accordance with a communication protocol. Note that the industrial asset inspection platform 150 might in some cases be associated with a third party, such as a vendor that performs a service for an enterprise.

The industrial asset inspection platform 150 might be, for example, associated with a Personal Computer ("PC"), laptop computer, smartphone, an enterprise server, a server farm, and/or a database or similar storage devices. According to some embodiments, an "automated" industrial asset inspection platform 150 may automatically facilitate the creation of inspection reports 180. As used herein, the term "automated" may refer to, for example, actions that can be performed with little (or no) intervention by a human.

As used herein, devices, including those associated with the industrial asset inspection platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The industrial asset inspection platform 150 may store information into and/or retrieve information from the meta-data inspection data store 110 and/or the inspection plan data store 120. The meta-data inspection data store 110 and/or the inspection plan data store 120 may contain data that was downloaded, that was originally input by an operator of an enterprise, that was generated by the industrial asset inspection platform 150, etc. The meta-data inspection data store 110 and/or the inspection plan data store 120 may be locally stored or reside remote from the industrial asset inspection platform 150. As will be described further below, the meta-data inspection data store 110 and/or the inspection plan data store 120 may be used by the industrial asset inspection platform 150 to generate inspection reports 180. Although a single industrial asset inspection platform 150 is shown in FIG. 1, any number of such devices may be included. Moreover, various devices described herein might be combined according to embodiments of the present invention. For example, in some embodiments, the industrial asset inspection platform 150, meta-data inspection data store 110 and/or the inspection plan data store 120 be co-located and/or may comprise a single apparatus.

In some cases, the inspection data streams are received from inspection "robots" that fly themselves and/or are wirelessly controlled via the industrial asset inspection platform 150 (e.g., by a human monitor using the remote user interfaced device 170). As used herein, the term "robot" might refer to a machine (e.g., an electro-mechanical apparatus) capable of carrying out a set of tasks (e.g., movement of all or part of the machine, operation of one or more type of sensors to acquire sensed data or measurements, and so forth) automatically (e.g., at least partially without input, oversight, or control by a user), such as a set of tasks programmed by a computer. Note that an inspection robot may include one or more sensors to detect one or more characteristics of an industrial asset. The inspection robot may also include a processing system that includes one or more processors operatively coupled to memory and storage components.

Figure 2:
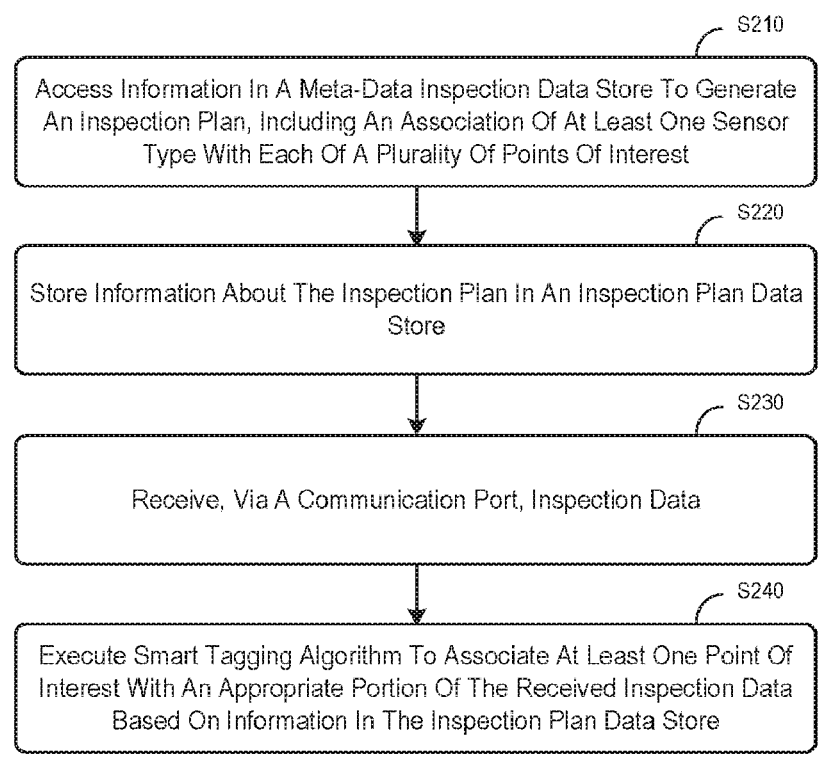
FIG. 2 illustrates an industrial asset inspection method that might be performed according to some embodiments.

According to some embodiments, the system 100 may provide intelligent and automated review of industrial asset integrity data. Note that the system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may access information in a meta-data inspection data store to generate an inspection plan. According to some embodiments, the inspection plan includes an association of at least one sensor type with each of a plurality of points of interest (e.g., locations of the asset where defects have occurred in the past, are predicted to occur in the future, etc.). Note that the meta-data inspection data store may contain electronic records associated with the industrial asset, and the electronic records may represent hierarchical components and subcomponents of the industrial asset and define the plurality of points of interest. According to some embodiments, information in the meta-data inspection data store is arranged via a schema, a template, an enumerated list of simple data types, an enumerated list of structured data types, and/or an enumerated list of simple and structured data types. As used herein, the phrase "industrial asset" might refer to, by ways of examples only, a flare stack, a wind turbine, a power grid, an aircraft, a locomotive, a pipe, a storage tank, a dam, etc.

According to some embodiments, the generation of the inspection plan at S210 might also be based on other information. For example, the generation of the inspection plan might be further based on a description of inspection related artifacts, including those found in another inspection plan, an inspection report, and/or historical reviews (e.g., using natural language processing). According to other embodiments, the inspection plan might be based on historical defects, an explicit process, an implicit process, a three-dimensional model of the industrial asset, a digital metric model of the industrial asset, a natural language specification, a formal inspection plan, an environment surrounding the industrial asset, etc. In addition to a set of points of interest, the inspection plan might be associated with a set of points of interest grouped together as a "region of interest" (e.g., on a particular sub-component), an anomaly associated with a point of interest, a perspective associated with a point of interest (e.g., a camera angle and/or level of zoom that should be employed by an inspection camera), and/or an amount of time associated with a point of interest (e.g., defining how long a sensor should collect data at that location).

At S220, the system may store information about the inspection plan in an inspection plan data store. At S230, the system may receive, via a communication port, inspection data. For example, the system may receive manually collected inspection data and/or at least one stream of sensor information from at least one inspection device (e.g., an inspection robot, a fixed sensor, etc.). For example, at least one of the sensor data streams may be received from an inspection device indicating one or more characteristics of the industrial asset. Note that an inspection device may include a plurality of sensors to collect sensor information. Examples of such devices might include a fixed sensor, a robot, a drone, a wheeled vehicle, a vehicle adapted to travel along a track, a climbing vehicle, a crawling vehicle, etc. Examples of sensors that might be employed include a camera, a video camera, an Infra-Red ("IR") camera, a microphone, a chemical detector, a Light Detection and Ranging ("LIDAR") sensor, a radiation detector, a thermal imaging apparatus, an ultrasonic testing device, etc. Although some examples are described herein in connection with a single inspection device or robot, not that an inspection plan might instead be associated with a plurality of inspection devices or robots simultaneously collecting information. In addition to sensor data, the industrial asset inspection platform might receive, from an inspection device, additional data such as information about planned objectives, Global Positioning System ("GPS")/Differential GPS ("DGPS") coordinates, altitude information, proximity information, battery information, mission critical information, safety critical information, Inertial Measurement Unit ("IMU") data, etc.

At S240, the system may execute a smart tagging algorithm to associate at least one of the plurality of points of interest with an appropriate portion of the received inspection based on information in the inspection plan data store (e.g., the system might automatically identify an appropriate portion of a received stream of sensor information). For example, the smart tagging algorithm might be associated with a partially manual tagging of data to a point of interest, an automatic tagging of data to a point of interest, correlated and collated elements from disparate data streams, GPS/DGPS data, IMU data, automated defect recognition, asset context extracted via a natural language description, etc. According to some embodiments, the system may automatically generate an inspection report based on the appropriate portions of the received inspection data (e.g., portions of streams of sensor information). The inspection report may then be stored in an inspection information data store. Note that the generation (e.g., automatic or partially automatic) generation of the inspection report might include combining previously stored data (e.g., boilerplate language, past inspection results, etc.) with the appropriate portion of the received stream of sensor information.

Figure 3:
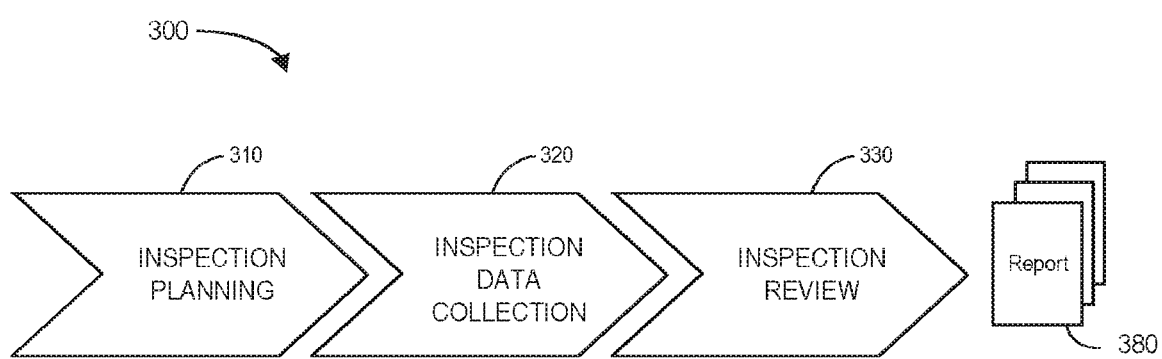
FIG. 3 illustrates an inspection process flow in accordance with some embodiments.

FIG. 3 illustrates an inspection process flow 300 in accordance with some embodiments. In particular, the process flow includes inspection planning 310 (described with respect to FIGS. 5 and 6), followed by inspection data collection 320 (described with respect to FIGS. 7 and 8) and inspection review 330 (described with respect to FIG. 9) to generate reports 380. That is, industrial asset inspections may consist of inspection planning 310, inspection data collection 320, and inspection review 330 processes. Note that there may be several different tools and techniques available to inspect various asset types. Moreover, a given asset type may be inspected by different tools and techniques. For example, a petrochemical refinery flare stack's flange or bolts may be visually inspected for damage due to corrosion using photographic or thermal imaging. The flare stack's pilot and fuel gas piping may instead use ultrasonic testing to ascertain minimum operating thickness to ensure mechanical integrity. With prior inspection approaches, inspectors used different specialized tools and software to collect and analyze the data before creating an overall assessment.

Figure 4:
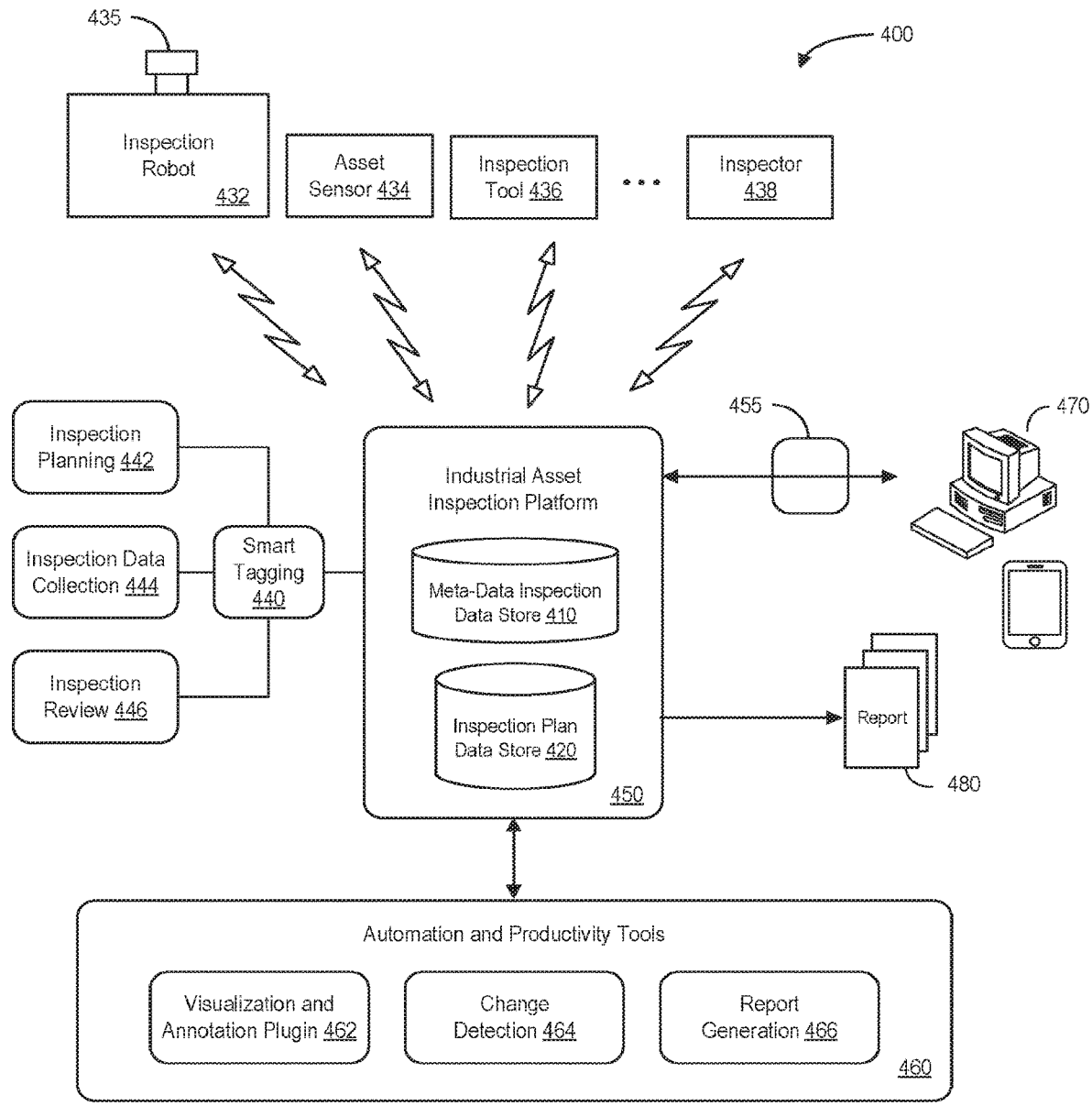
FIG. 4 is a more detailed example of an industrial asset inspection system according to some embodiments.

To improve on this approach, FIG. 4 provides a more detailed example of an industrial asset inspection system 400 according to some embodiments. That is, the FIG. provides an overall schematic view of some embodiments that integrate various inspection techniques into a unified approach. In some embodiments, a meta-data specification may describe inspection related artifacts such as inspection plans, reviews, inspection reports, defects, and sensor data streams and their specification. Note that the meta-data might be stored using schemas, templates, or enumerated list of simple and structured data types.

As before, the system 400 includes an industrial asset inspection platform 450 that may access information in a meta-data inspection data store 410 (e.g., storing a set of electronic records representing hierarchical components and sub-components of an industrial asset and defining points of interest) and an inspection plan data store 420 (e.g., storing a set of electronic records defining an inspection plan including, for example, sensor data, points of interest, a path of movement for an inspection robot, etc.). The industrial asset inspection platform 450 may also exchange information with remote user interface devices 470 (e.g., via a firewall 455). According to some embodiments, the industrial asset inspection platform 450 may communicate with the user interface devices 470 and access information in the meta-data inspection data store 410 and/or the inspection plan data store 420.

The industrial asset inspection platform 450 may also exchange inspection data streams with various devices, such as an inspection robot 432 with a camera 435, an asset sensor 434, an inspection tool 436, an inspection 438 (e.g., who manually annotates data), etc. The inspection data platform 450 may also execute smart tagging 440, such as tagging associated with inspection planning 442, inspection data collection 444, inspection review 446, etc. According to some embodiments, the inspection data platform may further utilize automation and productivity tools 460, such as those associated with a visualization and annotation plugin (described with respect to FIG. 10), change detection 464 (described with respect to FIG. 11), and/or report generation (described with respect to FIG. 12). As will be described further below, the meta-data inspection data store 410 and/or the inspection plan data store 420 may be used by the industrial asset inspection platform 450 to generate inspection reports 480. Although a single industrial asset inspection platform 450 is shown in FIG. 4, any number of such devices may be included. Moreover, various devices described herein might be combined according to embodiments of the present invention. For example, in some embodiments, the industrial asset inspection platform 450, meta-data inspection data store 410 and/or the inspection plan data store 420 be co-located and/or may comprise a single apparatus.

Figure 5:
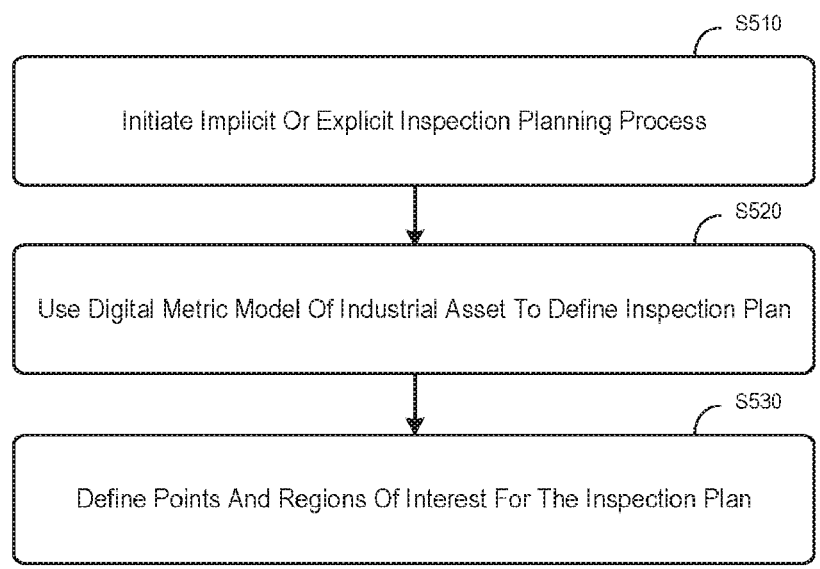
FIG. 5 illustrates an inspection planning method that might be performed in accordance with some embodiments.

FIG. 5 illustrates an inspection planning method that might be performed in accordance with some embodiments. At S510, inspection planning may be initiated. Note that the inspection planning initiated at S510 may occur as an explicit or an implicit process. As an explicit process, an inspection plan may reference an asset (or asset subcomponents) that need to be inspected. At S520, the system may use a digital metric model of the actual asset under inspection for defining an inspection plan. Using the digital model (or using a natural language specification), an inspection plan may define to points of interest and/or regions of interest for inspections at S530. These may, for example, uniquely correspond to points and regions on the asset under inspection. Data used to describe the asset, the asset hierarchy, and inspection plan (including points and regions of interest) may comprise a subset of the system's meta-data specifications.

Figure 6:
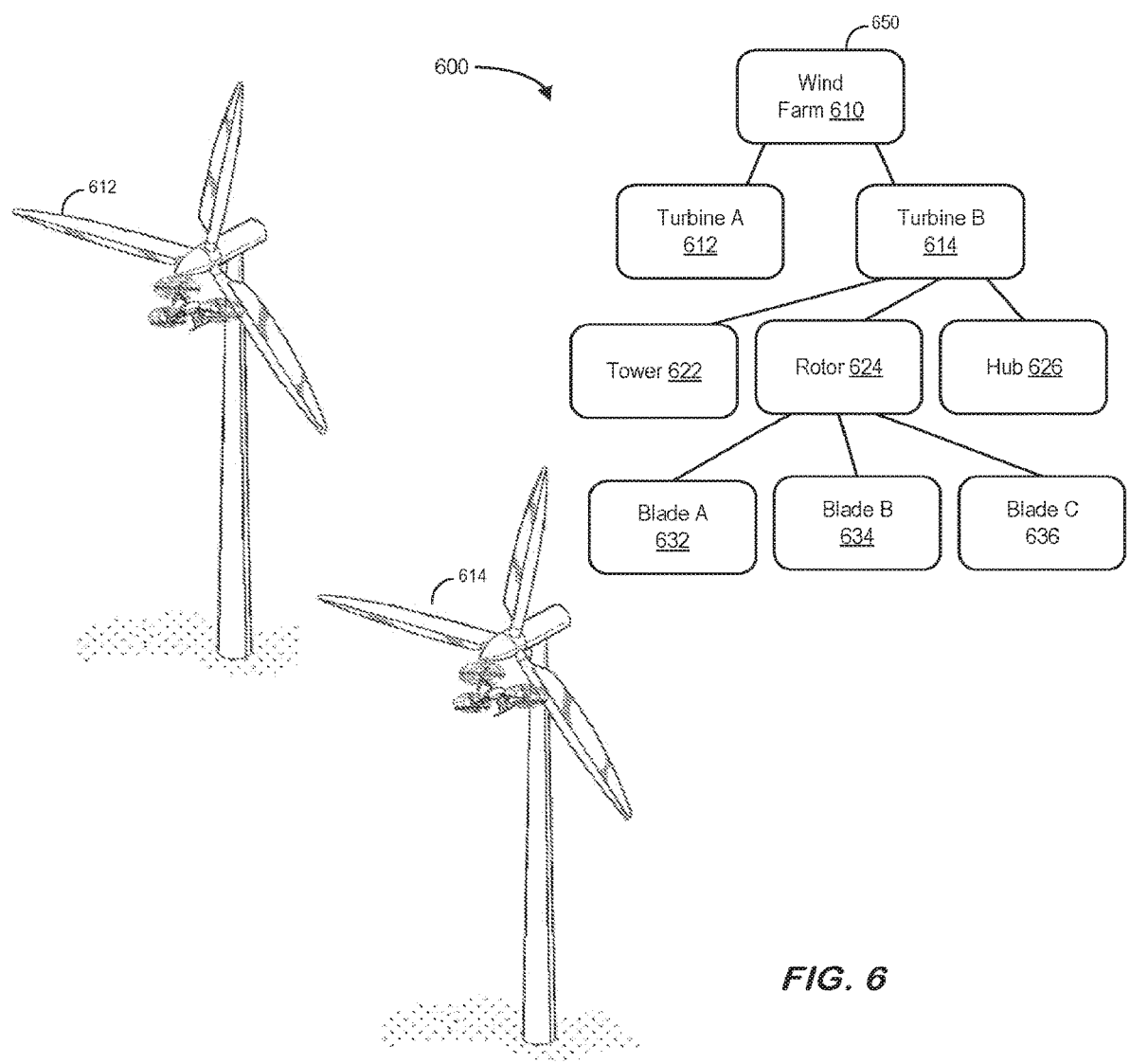
FIG. 6 is an example of an industrial asset and related industrial asset hierarchy according to some embodiments.

FIG. 6 is an example 600 of an industrial asset and related industrial asset hierarchy according to some embodiments. In particular, the example 600 is associated with a windfarm having two wind turbines 612, 614. Note that the meta-data specifications may define a hierarchy 650 associated with the industrial asset. In this example 600, the hierarchy 650 shows that the wind farm 610 includes the two turbines 612, 624. Moreover, turbine B 614 includes a tower sub-component 622, a rotor sub-component 624, and a hub sub-component. Similarly, the rotor sub-component 624 is comprised of rotor blade A 632, rotor blade B 634, and rotor blade C 636. The hierarchy 650 can then be used by the system to help automatically define an inspection plan and/or generate an inspection report.

Figure 7:
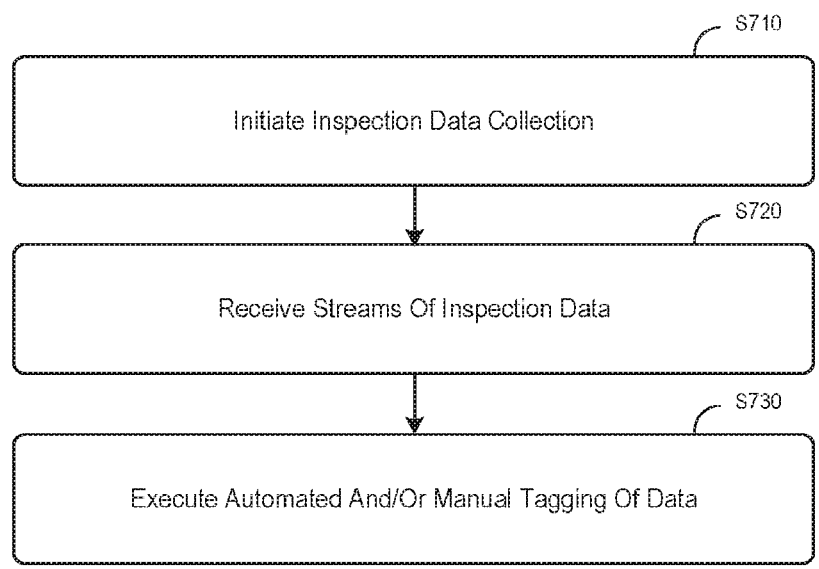
FIG. 7 illustrates an inspection data collection method that might be performed in accordance with some embodiments.

FIG. 7 illustrates an inspection data collection method that might be performed in accordance with some embodiments. At S710, inspection data collection may be initiated. Note that inspection data is typically collected at S720 using different sensors/tools as a manual process or by using robotic systems (such as drones and crawlers). Usually the data collection is guided by an inspection plan, but note that a formal inspection plan is not necessary with respect to embodiments described herein. If an inspection plan is provided, and the tools can automatically work off from that inspection plan, the data collected may be automatically tagged at S730 with the appropriate points and regions of interest. If not fully automated, an inspector may manually tag some or all of the data during a collection or review process. Additionally, note that the collection process may also tag data with GPS and IMU data. As used herein, the phrase "IMU" might refer to, for example, an electronic device that measures and reports a body's force, angular rate, and/or the magnetic field surrounding the body using a combination of accelerometers and gyroscopes, and/or magnetometers. According to some embodiments, certain tools may also optionally allow tagging of points and/or regions of interest with images when the data is collected.

Figure 8:
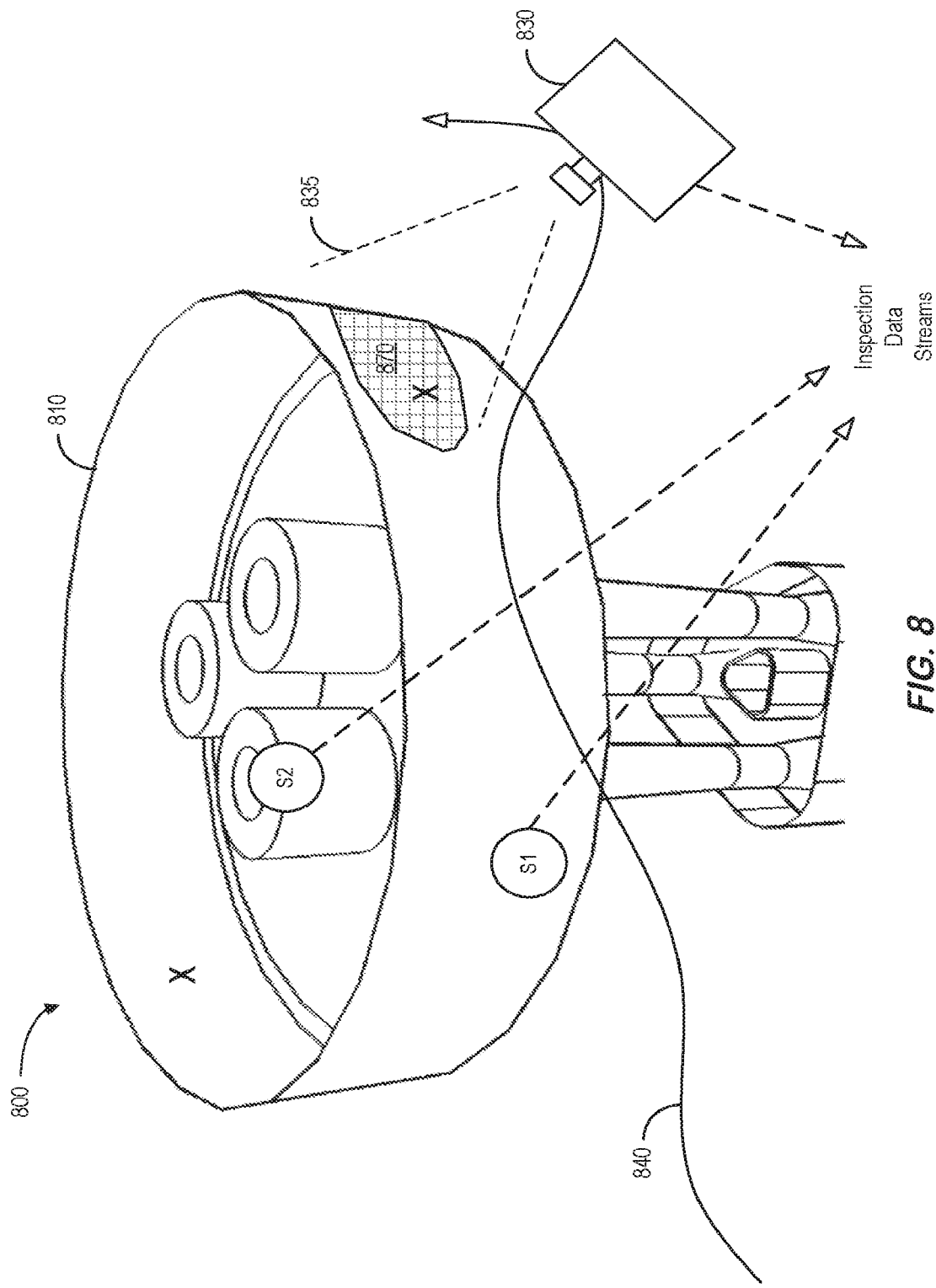
FIG. 8 illustrates inspection data collection according to some embodiments.

FIG. 8 is an example 800 of inspection data collection associated with an inspection plan for an industrial asset/model 810 in accordance with some embodiments. A flight path 840 representing movement for an inspection robot 830 may be defined by the inspection plan along with indications of points of interest ("X"). According to this embodiment, an orientation of the inspection robot 830 may also be defined along with a field of view 835 of a sensor on that robot 830. Such an approach might, for example, ensure that a point of interest is going to be within the field of view 835. According to some embodiments, a "sensed area of collection" 870 may also be projected onto a surface of the industrial asset model 810 (as indicated by the cross-hatched area in FIG. 8). The inspection robot 830, sensor 51, and sensor S2 may then all transmit inspection data streams to be collected (e.g., as illustrated by the dashed arrows of FIG. 8).

Figure 9:
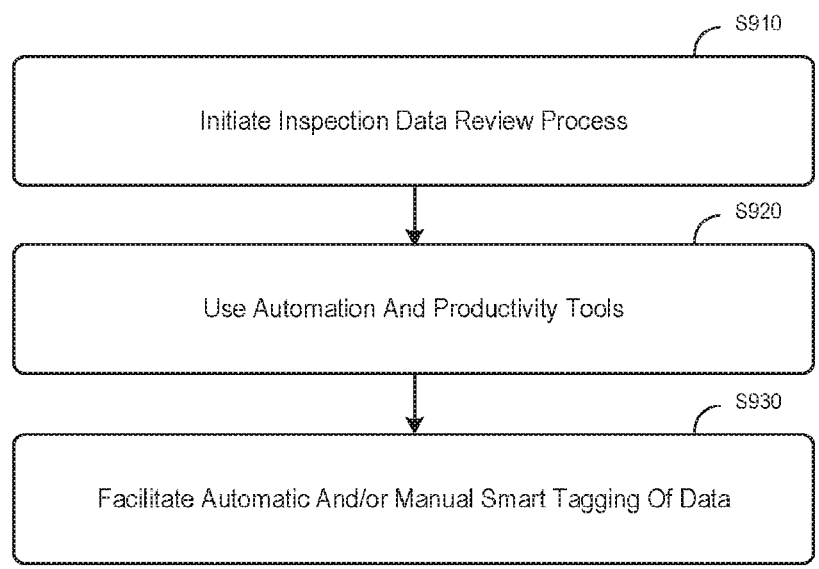
FIG. 9 is an example of an inspection review process that might be performed in accordance with some embodiments.

FIG. 9 is an example of an inspection review process that might be performed in accordance with some embodiments. At S910, the inspection review process may be initiated. Note that the inspection review process may let an inspector review the inspection data. The inspection review process may be accomplished using several automation and productivity tools at S920 in accordance with some embodiments. These tools may, for example, utilize the meta-data specifications and the specific inspection data. The system may then facilitate smart tagging at S930.

Figure 10:
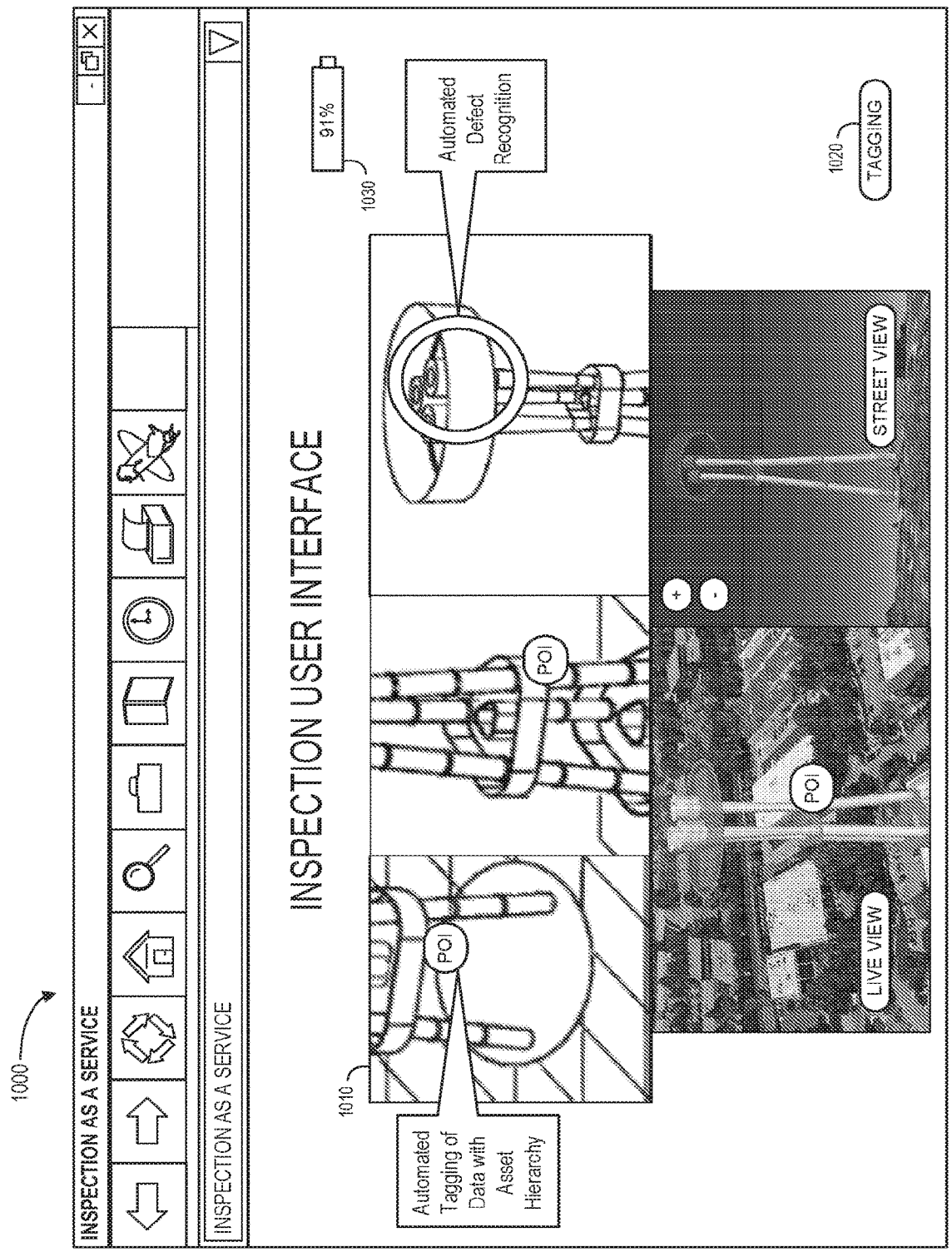
FIG. 10 illustrates an industrial asset user interface with smart tagging according to some embodiments.

Some examples of smart tagging will now be described in connection with FIG. 10, which is an interactive user interface display 1000 in accordance with some embodiments. The display 1000 might be associated with an inspection as a service process and include various representations of an industrial asset 1010, points of interest ("POI"), the nearby environment, etc. According to some embodiments, the display 1000 includes additional information, such as a live view of the area, a street view of the industrial asset, battery power 1030 of one or more inspection robots, automated defect recognition, etc. The display 1000 might further include an icon 1020 that, when selected by a human monitor (e.g., via a computer mouse or touchscreen), initiate a smart tagging process. In some cases, selection of an element on the display 1000 might result in further information being provided about that element (e.g., in a "pop-up" window), adjust display parameters (e.g., by zooming a portion of the display 1000 in or out), etc.

Thus, embodiments may provide a robotic system inspection plan. The inspection plan may include, for example, points of interest, anomalies to look for at each point of interest, a desired viewing perspective for each point of interest, etc. Based on the inspection needs, the robotics system generates a flight/motion plan around the asset that will be followed to collect inspection data as appropriate. The robotics system may also be provided with the three-dimensional model of the environment in which the inspection will be conducted. During the inspection execution, the robotic system may send information about planned objectives, namely the objectives that will be executed within the next few minutes/seconds, three-dimensional information about the operating environment, a live feed from a sensor (e.g., an RGB camera), GPS/DGPS coordinates, and any other safety critical information to the monitor of the user interface. This information may then be understood using a three-dimensional model of the industrial asset.

According to some embodiments, an industrial asset inspection platform may execute a visualization and annotation plugin to facilitate correlation and collation of disparate and historical data associated with the inspection report. For example, the visualization and annotation plugin may be associated with an interactive interface (e.g., the user interface display 1000) that lets a user select display elements to receive further information about those elements and annotate portions of the inspection report with user comments. As data is ingested, a smart tagging component may flexibly use various algorithms to correlate and collate various elements from disparate data streams. For example:

If formal inspection planning is used and the data collection system can utilize the formal inspection plans, smart tagging may execute point and/or region of interest tag matching for correlation of different data sources and use timestamps for collating historical data;

If formal inspection planning is not used, but the data collection system provides contextual incidental data (e.g., GPS/IMU data), the system can utilize the contextual incidental data to correlate;

Additionally, the system might use image analytics (if images are captured as part of the metadata) to automatically establish correspondence between data items; and Further, if natural language descriptions are provided, the system may process those descriptions to extract asset context and uses similarity metrics to establish correspondence between data elements.

Note that embodiments might utilize and combination of the above techniques to increase the confidence associated with the establishing correspondence.

According to some embodiments, an industrial asset inspection platform may execute a visualization and annotation plugin. Note that smart tagging may allow for correlation and collation of disparate and historical data such that an inspector can easily use the display 1000 to navigate across data views and invoke the most appropriate plugin to handle visualization and annotation. For example, Ultrasonic Testing ("UT") scans, infrared thermographs, and high resolution imagery data that correspond to a specific asset sub-component, such as a flare tip of a flare stack, can be explored using the unified interface. The inspector can drill into specific details by invoking a plugin that is registered to handle that specific data type. For example, an UT scan viewer may be invoked to visualize and annotate the UT data. The inspector can select a region and annotate the region with comments and/or findings as part of the review process.

Figure 11:
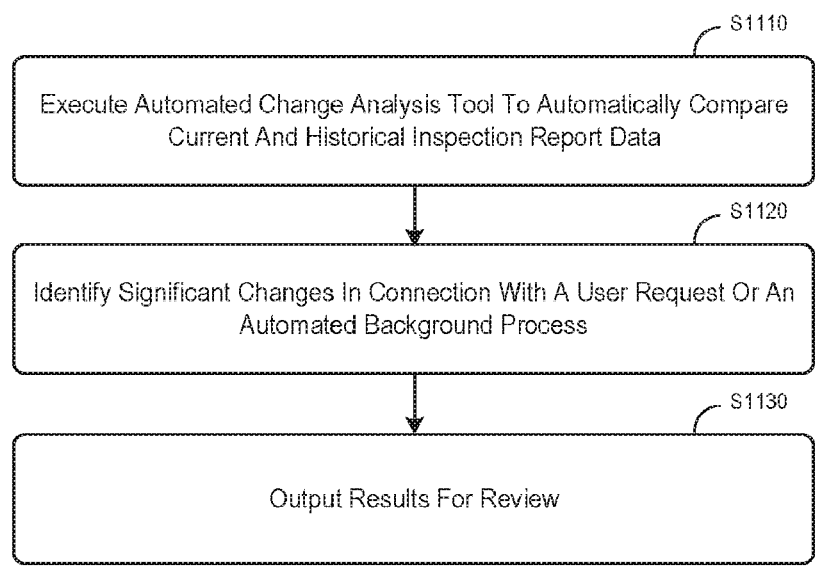
FIG. 11 is an example of a change detection method that might be performed in accordance with some embodiments.

FIG. 11 is an example of a change detection method that might be performed in accordance with some embodiments. At S1110, an industrial asset inspection platform may execute an automated change analysis tool to automatically compare current and historical inspection report data and generate a change summary and trend analysis output. According to some embodiments, at S1120 the change analysis tool automatically identifies significant changes in connection with a user request and/or an automated background process. Thus, embodiments may embed automated change analysis tools that look at current and historical data to provide change summary and trend analysis. Changes that are material can be annotated and stored as part of the review. An inspector can invoke change analysis on demand or the system might instead perform the change analysis in background. The results may then be provided at S1130 when ready for review.

Figure 12:
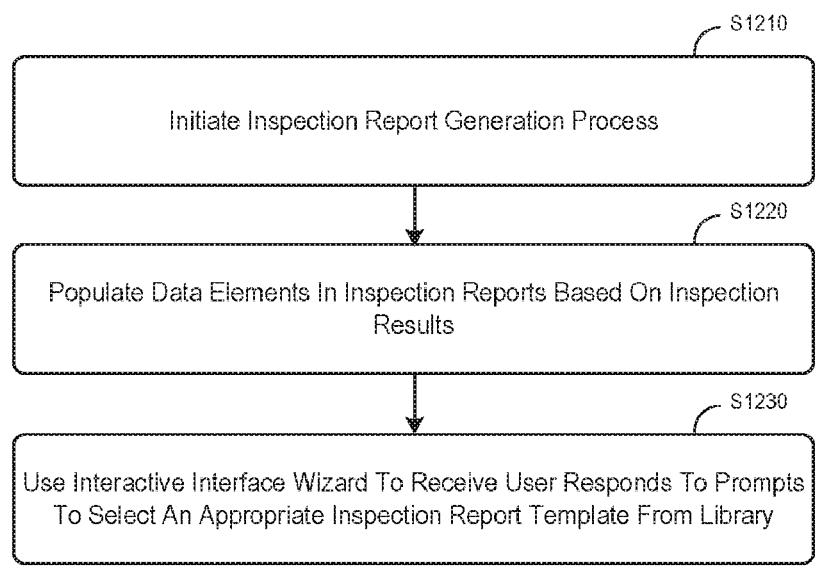
FIG. 12 is an example of a report generation method that might be performed according to some embodiments.

FIG. 12 is an example of a report generation method that might be performed according to some embodiments. At S1210, an automatic generation of an inspection report is performed in accordance with a report format selected from a library of inspection report templates. According to some embodiments, each template refers to data elements to be populated at S1220 when the inspection report is generated. Note that the data elements may include tables and change summaries, and the automatic generation of the inspection report may be associated with an interactive interface wizard where a user responds to prompts to select the appropriate inspection report template from the library at S1230. Thus, embodiments may provide an ability to automatically generate inspection reports based upon various reporting formats. The report generation process may be associated with a library of inspection report templates. Each template may refer to data elements (such as tables and change summaries) which are populated during the report generation process from the specific elements stored in the system. Some embodiments may also allow for an interactive wizard driven approach where the system "interviews" the inspector, via a series of questions/prompts, on what needs to be included in the inspection reports and automatically retrieves and formats the appropriate data and publishes it as a downloadable report.

Figure 13:
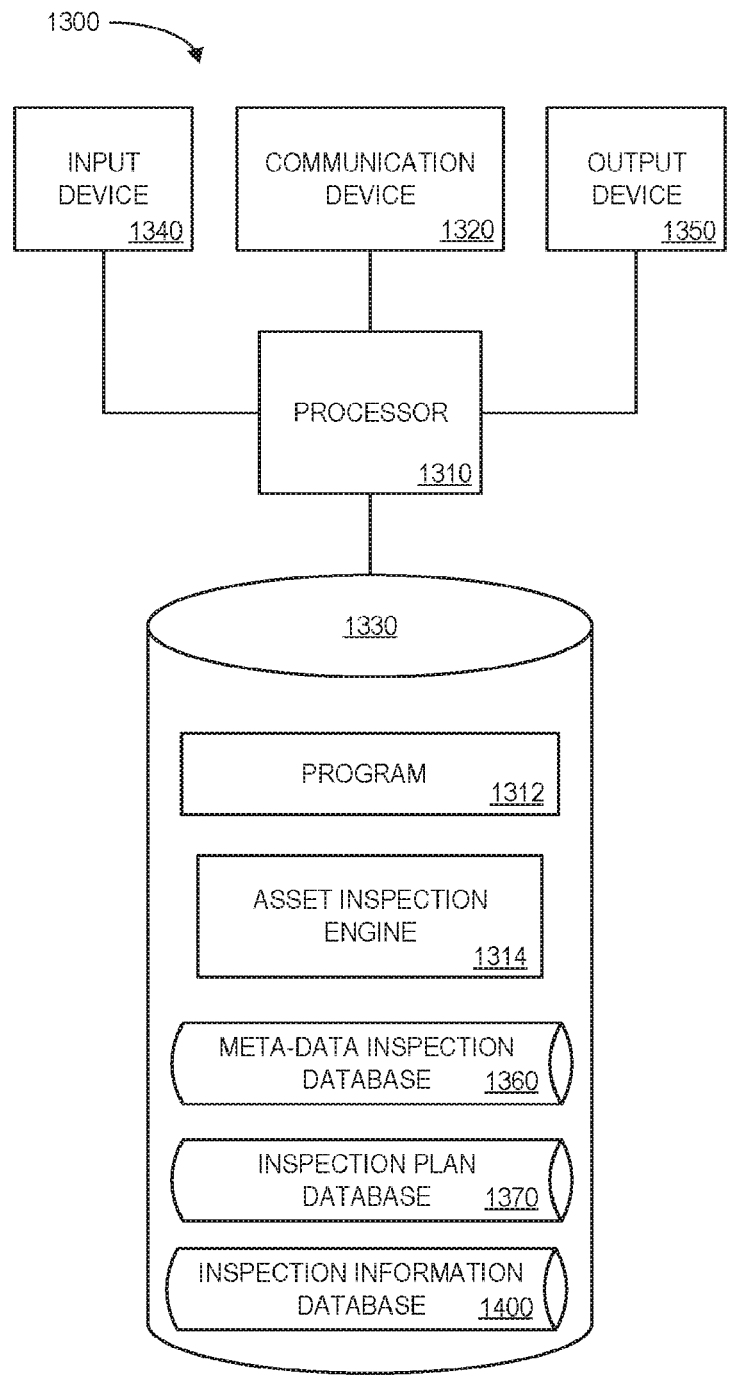
FIG. 13 illustrates an industrial asset inspection platform in accordance with some embodiments.

The embodiments described herein may be implemented using any number of different hardware configurations. For example, FIG. 13 is block diagram of an industrial asset inspection platform 1300 that may be, for example, associated with the system 100 of FIG. 1. The industrial asset inspection platform 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote inspection robots, user interface devices, etc. The industrial asset inspection platform 1300 further includes an input device 1340 (e.g., a computer mouse and/or keyboard to input inspection information, asset modeling data, drone control signals, etc.) and/an output device 1350 (e.g., a computer monitor to render a user interface display, transmit control signals to inspection robots, etc.). According to some embodiments, a mobile device and/or PC may be used to exchange information with the industrial asset inspection platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or an asset inspection engine 1314 for controlling the processor 1310. The processor 1310 performs instructions of the programs 1312, 1314, and thereby operates in accordance with any of the embodiments described herein. For example, the processor 1310 may access electronic records that contain hierarchical components and subcomponents of an industrial asset and define points of interest. The processor 1310 may access that information and generate an inspection plan, including an association of at least one sensor type with each of the points of interest. The processor 1310 may then store information about the inspection plan and receive inspection data (e.g., manually collected data, at least one stream of sensor information from at least one inspection device, etc.). A smart tagging algorithm may then be executed by the processor 1310 to associate at least one point of interest with an appropriate portion of the received inspection data. According to some embodiments, the processor 1310 may then generate an inspection report based on the appropriate portions of the received inspection data and store the inspection report.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the monitoring and control platform 1300 from another device; or (ii) a software application or module within the industrial asset inspection platform 1300 from another software application, module, or any other source.

In some embodiments (such as the one shown in FIG. 13), the storage device 1330 further stores a meta-data inspection database 1360, an inspection plan database 1370, and an inspection information database 1400. An example of a database that may be used in connection with the industrial asset inspection platform 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the inspection information database 1400 that may be stored at the industrial asset inspection platform 1300 according to some embodiments. The table may include, for example, entries identifying asset inspection processes that have been executed in accordance with any of the embodiments described herein. The table may also define fields 1402, 1404, 1406, 1408, 1410, 1412, 1414 for each of the entries. The fields 1402, 1404, 1406, 1408, 1410, 1412, 1414 may, according to some embodiments, specify: an asset inspection identifier 1402, an asset identifier 1404, asset hierarchy data 1406, inspection plan data 1408, points of interest 1410, collected sensor data 1412, and smart tags 1414. The inspection information database 1400 may be created and updated, for example, when an industrial asset is installed, inspections are performed, etc.

The asset inspection identifier 1402 may be, for example, a unique alphanumeric code identifying an inspection process that was performed by an inspection robot (and might include the date and/or time of the inspection). The asset identifier 1404 might identify the industrial asset that was being inspected. The asset hierarchy 1406 may define how components and sub-components of the industrial asset are related, and the inspection plan data 1408 might comprise the information that used to conduct the inspection. The points of interest 1410 might be used, for example, to define a flightpath for a drone. The collected sensor data 1412 might include the pictures, videos, etc. used to record characteristics of the industrial asset being inspected. The smart tags 1414 might include information that was automatically and/or manually associated with particular portions of the collected sensor data 1412.

Thus, some embodiments may provide systems and methods to facilitate an intelligent and automated review of industrial asset integrity data in an accurate and efficient fashion. Moreover, smart tagging may fuse different data sources and use automation tools for analysis so that an inspector can rapidly review data and automatically generate a final inspection report. Embodiments may realize a unified approach to aggregating various inspection techniques by using meta-specifications and intelligent tagging algorithms that correlate data, information, and analytics. Embodiments may further provide a plugin architecture that intelligently invokes most appropriate data visualization and annotation engines that reduce the need for working with multiple software tools. In addition, embodiments may input inspection data, annotations, and a report template and automatically generates an inspection report as an output.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
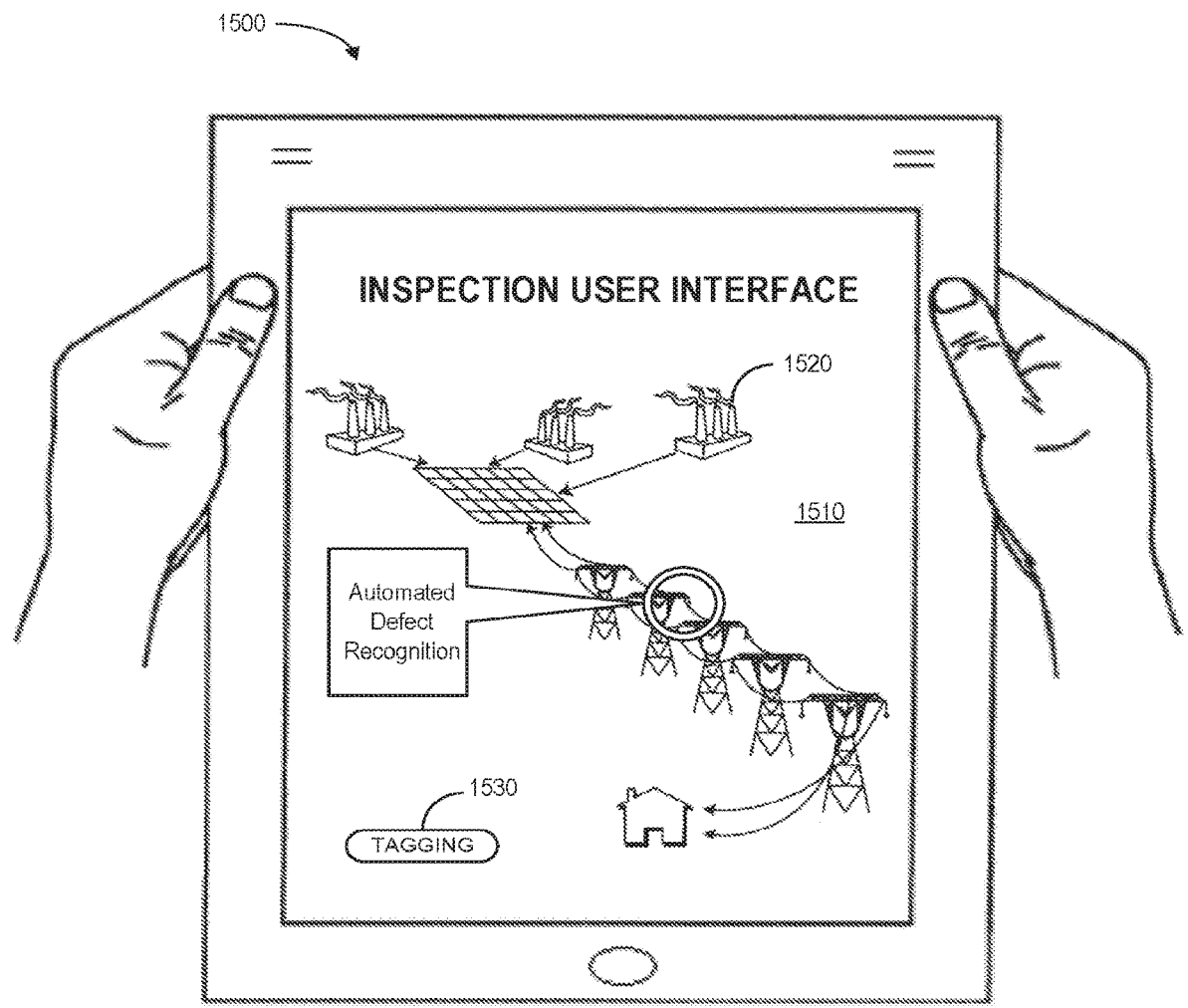
FIG. 15 illustrates a tablet computer displaying an interactive graphical user interface according to some embodiments.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on certain types of industrial asset damage or inspection, any of the embodiments described herein could be applied to other situations, including cyber-attacks, weather damage, etc. Moreover, the displays described herein are used only as examples, and any number of other types of displays could be used. For example, FIG. 15 illustrates a tablet computer 1500 displaying an interactive graphical user interface 1510 according to some embodiments. In particular, the display 1510 includes smart tags and/or automated defect recognition associated with an inspection robot proximate to an industrial asset 1520 (e.g., elements of a power grid). Moreover, the touchscreen of the tablet 1500 may be used to select an icon 1530 that initiates a smart tagging process.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for inspecting an industrial asset, comprising:
a drone configured to travel along a flight path and acquire, via one or more sensors, inspection data during an inspection of an industrial asset;
an industrial asset inspection platform communicatively coupled to the drone, the industrial asset inspection platform comprising
a meta-data inspection data store containing electronic records associated with the industrial asset, the electronic records representing hierarchical components and subcomponents of the industrial asset and defining one or more points of interest of the asset;
an inspection plan data store containing electronic records associated with an inspection plan for the industrial asset;
a communication device configured to receive the inspection data from the drone;
an inspection information data store configured to receive the inspection data from the communication device; and
at least one computer processor operatively coupled to at least one memory, wherein the processor is configured to:
access information in the meta-data inspection data store to generate the inspection plan, including an association of the one or more sensors with each of the one or more points of interest,
store information about the inspection plan in the inspection plan data store,
determine the flight path based on the inspection plan,
receive, via the communication device, the inspection data from the one or more sensors,
provide a visual representation of the industrial asset to a user interface display communicatively coupled to the processor, and
generate, via a smart tagging algorithm, within the visual representation, one or more smart tags defining an association of the one or more points of interest with inspection data corresponding to the one or more points of interest based on the received inspection data and the inspection plan.

2. The system of claim 1, wherein an inspection results record stored in the inspection information data store includes a table identifying at least one of an asset inspection identifier, an asset identifier, asset hierarchy data, inspection plan data, point of interest data, sensor data, and the one or more smart tags.

3. The system of claim 1, wherein the received inspection data comprises at least one stream of sensor information from the one or more sensor.

4. The system of claim 3, wherein the processor of the industrial asset inspection platform is further configured to:
automatically generate an inspection report based on the appropriate portions of the received streams of sensor information;
store the inspection report in the inspection information data store; and
provide the inspection report to the user interface display.

5. The system of claim 4, wherein the generation of the inspection report includes combining previously stored data with the appropriate portion of the received stream of sensor information.

6. The system of claim 3, wherein the generation of the inspection plan is further based on at least one of: a description of inspection related artifacts, another inspection plan, an inspection report, historical reviews, historical defects, an explicit process, an implicit process, a three-dimensional model of the industrial asset, a digital metric model of the industrial asset, a natural language specification, a formal inspection plan, and an environment surrounding the industrial asset.

7. The system of claim 3, wherein the inspection plan is further associated with at least one of: a set of points of interest grouped together as a region of interest, an anomaly associated with a point of interest, a perspective associated with a point of interest, and an amount of time associated with a point of interest.

8. The system of claim 3, wherein at least one of the sensor data streams is received from the drone indicating one or more characteristics of the industrial asset.

9. The system of claim 8, wherein the drone is included in a plurality of drones configured to simultaneously acquire inspection data and each of the drones includes a plurality of sensors to collect sensor information.

10. The system of claim 9, wherein at least one sensor is associated with at least one of: a camera, a video camera, an infra-red camera, a microphone, a chemical detector, a Light Detection and Ranging ("LIDAR") sensor, a radiation detector, thermal imaging, and ultrasonic testing.

11. The system of claim 3, wherein the industrial asset inspection platform further receives, from the drone, at least one of: information about planned objectives, Global Positioning System ("GPS") coordinates, Differential GPS ("DGPS") coordinates, altitude information, proximity information, battery information, mission critical information, safety critical information, and Inertial Measurement Unit ("IMU") data.

12. The system of claim 3, wherein information in the meta-data inspection data store is arranged via at least one of: a schema, a template, an enumerated list of simple data types, an enumerated list of structured data types, and an enumerated list of simple and structured data types.

13. The system of claim 3, wherein the industrial asset is associated with at least one of: a flare stack, a wind turbine, a power grid, an aircraft, a locomotive, a pipe, a storage tank, and a dam.

14. The system of claim 3, wherein the smart tagging algorithm is associated with at least one of: a partially manual tagging of data to a point of interest, an automatic tagging of data to a point of interest, correlated and collated elements from disparate data streams, Global Positioning System ("GPS") data, Differential GPS ("DGPS") data, Inertial Measurement Unit ("IMU") data, automated defect recognition, and asset context extracted via a natural language description.

15. The system of claim 3, wherein the one or more smart tags facilitate correlation and collation of disparate and historical data associated with an inspection report.

16. The system of claim 15, wherein the processor is further configured to receive, via the user interface display, a user selection of an element within the visual representation; and provide, within the visual representation, further information associated with the selected element.

17. The system of claim 1, wherein the flight path includes an orientation and a field of view of at least one sensor of the drone.

18. A method for inspecting an industrial asset, comprising:

accessing, by an industrial asset inspection platform, information in a meta-data inspection data store to generate an inspection plan for performing an inspection of the industrial asset by a drone, the inspection plan including an association of one or more sensors with one or more points of interest corresponding to the industrial asset, wherein the meta-data inspection data store contains electronic records associated with the industrial asset, the electronic records representing hierarchical components and subcomponents of the industrial asset and defining the one or more points of interest;

storing information about the inspection plan in an inspection plan data store;

determining a flight path for the drone based on the inspection plan;

transmitting the inspection plan to the drone;

performing the inspection of the industrial asset by the drone, wherein the drone is configured to travel along the flight path while performing the inspection;

transmitting inspection data acquired by the drone during the inspection of the industrial asset to the industrial asset platform;

receiving, via a communication device of the industrial asset inspection platform, at least one stream of sensor information from the one or more sensors during the inspection of the industrial asset;

provide a visual representation of the industrial asset to a user interface display communicatively coupled to the industrial asset inspection platform; and generate, via a smart tagging algorithm, within the visual representation, one or more smart tags defining an association of the one or more points of interest with inspection data corresponding to the one or more points of interest based on the received inspection data and the inspection plan.

* * * * *